Feb. 14, 1956 — H. F. GEISLER — 2,734,537
APPARATUS FOR SEPARATING MEAT FROM BONES
Filed Aug. 2, 1954 — 2 Sheets-Sheet 1

INVENTOR.
H. F. GEISLER
BY
A. Yates Dowell
ATTORNEY

Feb. 14, 1956  H. F. GEISLER  2,734,537
APPARATUS FOR SEPARATING MEAT FROM BONES
Filed Aug. 2, 1954  2 Sheets-Sheet 2

INVENTOR
H.F. GEISLER
BY A. Yates Dowell
ATTORNEY

United States Patent Office 2,734,537
Patented Feb. 14, 1956

2,734,537

APPARATUS FOR SEPARATING MEAT FROM BONES

Harold F. Geisler, Tucker, Ga., assignor to Meat Separator Corporation, Atlanta, Ga., a corporation of Georgia Application August 2, 1954, Serial No. 448,213

15 Claims. (Cl. 146—76)

This is a continuation-in-part of application Serial No. 345,915, filed March 31, 1953 by Harold F. Geisler and John R. Thompson.

This invention relates to material separation including apparatus for and the method of separating relatively soft from relatively hard portions of substances, edible or otherwise, and particularly for separating edible from inedible substances including removing meat from the neck and other bones of chickens, turkeys and other fowls, removing the edible from the inedible portions of certain seafoods such as crabs, lobsters, fish and the like, as well as for removing edible from inedible portions of certain animals.

The separation of relatively soft substances, some of which are edible, from harder substances has been tedious and difficult, and has resulted in substantial waste of material and revenue. An example of this has been waste resulting from the inability to readily separate meat of the necks of chickens, turkeys and other fowls from the edible bone portions of the same.

It is an object of the invention to provide a method of and apparatus for separating soft from relatively hard portions of substances, edible or otherwise, particularly for separating edible and inedible substances including removing meat from neck and other bones of chickens, turkeys and other fowls, removing the edible from inedible portions from certain seafood such as crabs, lobsters, fish and the like, as well as for removing edible from inedible portions of certain animals and in which apparatus the soft or separated substance will be collected in a pan which can be readily removed for further processing, distribution or direct use of the product, and a machine from which accumulated relatively hard substance such as bone, cartilage and the like may be removed when sufficient has accumulated or at desired times.

Another object of the invention is to provide a machine of relatively simple and durable construction in which a relatively large quantity of usable substance may be obtained in proportion to the quantity of material treated, and a machine which is easy to clean and sterilize, economical to manufacture and effective and efficient in operation.

Figures 1, 3, 4, 5:
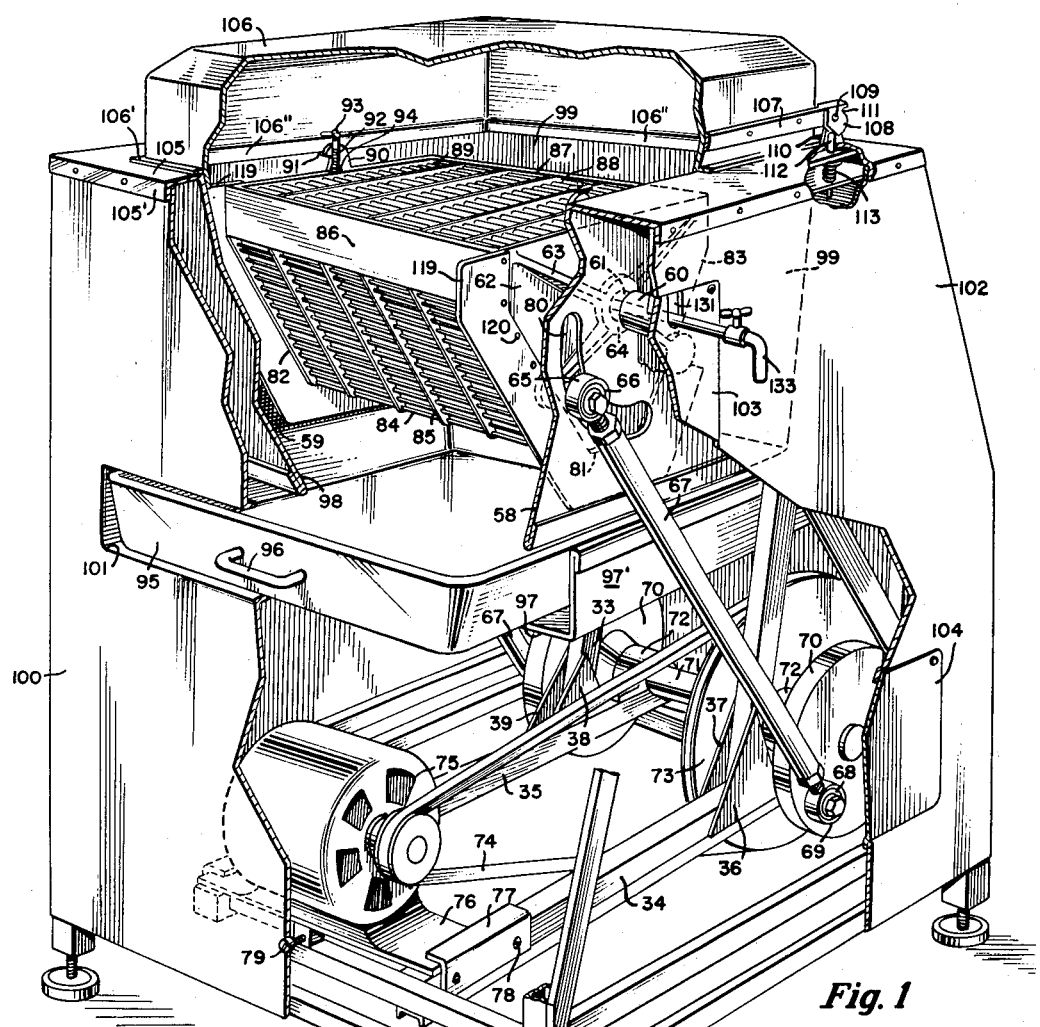
Figure 2:
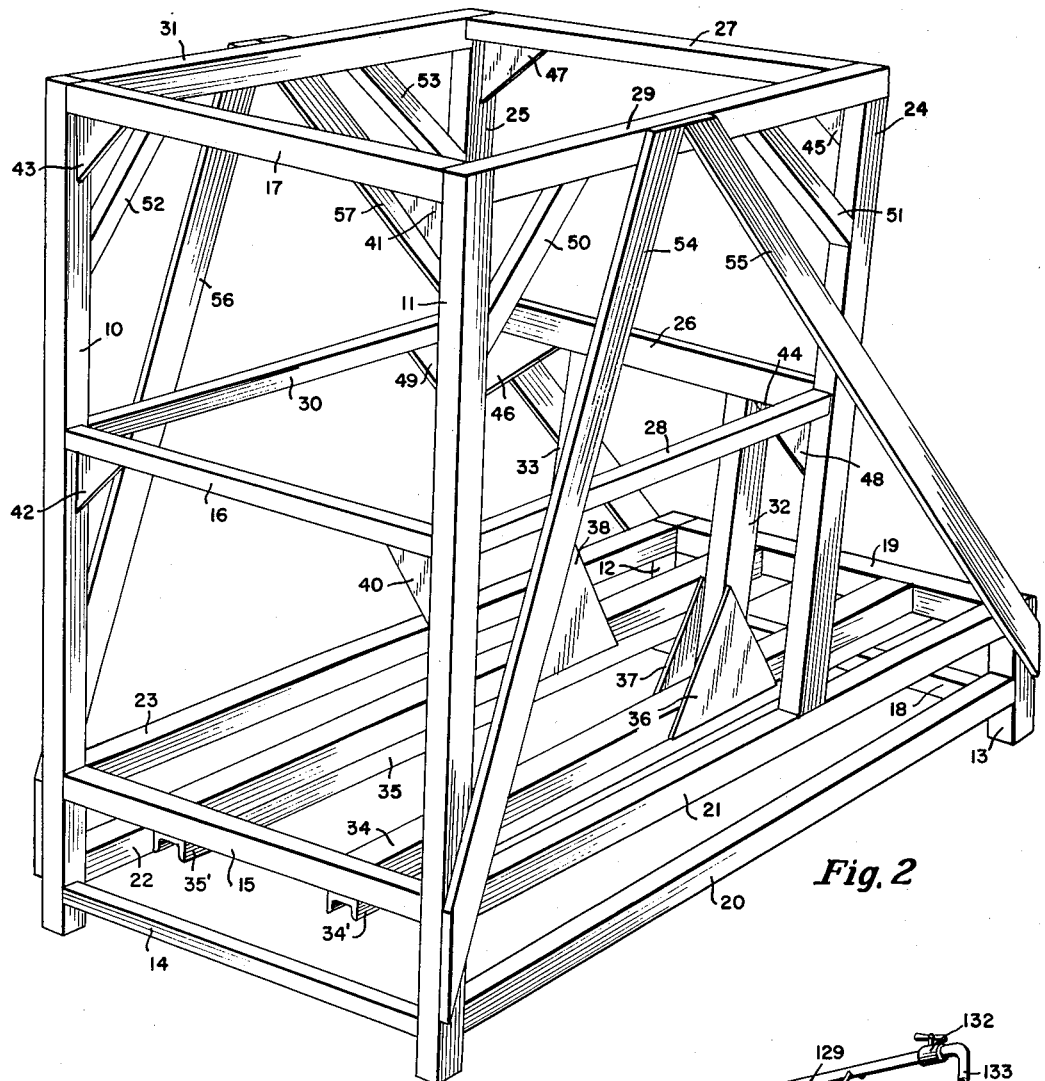
Figure 7:
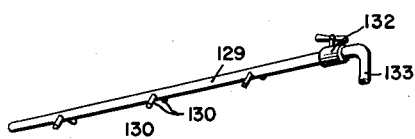
Figure 6:
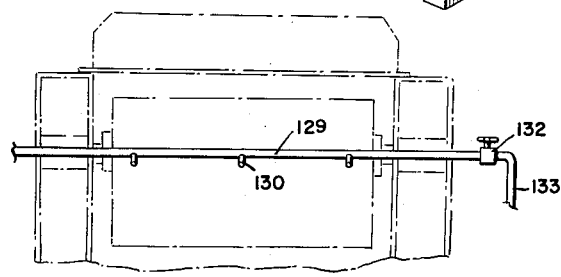

Further objects and advantages of the invention will be apparent from the following description taken in conjunction with the accompanying drawings, wherein:

Fig. 1 is a perspective view with parts broken away illustrating one application of the invention;

Fig. 2, a similar view of the frame of the machine;

Fig. 3, a modified form of container which may be used with the machine;

Fig. 4, another form of container usable with the machine;

Fig. 5, an enlarged sectional view of a form of resilient support and leg adjustment for supporting the machine taken along the line 5—5 of Fig. 1;

Fig. 6, a section of the basket and frame in phantom disclosing the fluid supply pipe and nozzles; and Fig. 7, a perspective of the fluid supply pipe and nozzles.

Briefly stated, the invention comprises a machine having a strong rigid frame in which is mounted a screening cage or container having a pair of solid end plates, a relatively narrow bottom, a wide top, and connected sides with the top, bottom and sides composed primarily of rods or bars having their end portions located in receiving openings in the end members and with reinforcing strips disposed transversely of such parallel bars or rods in spaced relation and with openings through which said bars or rods extend, such bars or rods being welded into the end plates and reinforcing strips to provide a rigid, durable grating or grillwork structure, the top of which is removably fastened in place to afford access to the interior. Due to the parallel spacing of the bars or rods, elongated discharge areas are provided through which softer material may be discharged and the harder material retained.

The screening cage is pivoted at each end on a common axis within the frame and to each of the end plates is eccentrically pivoted a connecting rod whose opposite ends are pivoted on cranks on disk wheels fixed on a transverse shaft having a relatively large pulley driven by a belt from a motor mounted so that it may be adjusted from the front of the machine to vary the tension on the driving belt. A fluid tube extends centrally through the axis of the screening cage and is adapted to have fluid, either liquid or gaseous, such as water or air, supplied for assisting in the separating process. A cover is provided for the top of the machine, such cover being mounted on hinges by means of which such cover may be maintained in an elevated position affording access to the screening cage. The machine is provided with a housing and at the front of this housing is an opening through which a pan or removable drawer can be slid into position beneath the screening cage to receive material discharged therefrom and guided in its fall by gravity after being discharged into such tray by aprons depending around the chamber in which the screening cage is located.

As will be apparent from the preceding description, the screening cage is mounted for oscillatory movement and for frequent sharp changes in the direction of movement so that the material treated within the screening cage will be projected against the walls of the cage with sufficient velocity to produce violent impact. Due to their rugged nature the screening cage and other parts of the machine will last for an indefinite period notwithstanding the force applied and the return snap motion of the screening cage caused by the reciprocation of the driving rods. The machine also will remain relatively fixed on the floor on which it is supported and noise will be minimized.

With continued reference to the drawings, the machine of the present invention comprises a supporting frame having tall upright front posts 10 and 11 and relatively short rear posts 12 and 13. The front posts are connected by horizontal members 14 and 15 adjacent their bottom ends, a central horizontal connecting member 16 and an upper horizontal connecting member 17. The rear legs 12 and 13 are connected by a pair of transverse or horizontal members 18 and 19. The front and rear posts 11 and 13 on one side of the machine are connected by parallel supporting bars 20 and 21, and on the opposite side of the machine the posts 10 and 12 are connected by corresponding parallel bars 22 and 23.

Intermediate upright posts 24 and 25 are mounted on the bars 21 and 23 at opposite sides of the machine and these posts are connected by an intermediate horizontal bar 26 and an upper horizontal bar 27. Also at the said one side of the machine the posts 11 and 24 are connected by an intermediate horizontal brace or bar 28 and a top horizontal connecting bar 29 while the posts 10 and 25 are connected by an intermediate brace or bar 30 and a top brace or bar 31. The horizontal bar 26 is additionally supported by posts 32 and 33 having their lower ends resting upon box-shaped beam members 34 and 35 reinforced by channel members 34' and 35', which channel members connect the front horizontal bar 15 with the rear horizontal bar 19. Triangular reinforcing plates 36 and 37 are connected to the bar 34 and post 32 and similar plates 38 and 39 (Fig. 1) connect the posts 33 with the bar 35.

Corner brackets or gusset plates 40 and 41 reinforce the joints between the horizontal bars 16 and 17 and the corner post 11 and in like manner, corner brackets or gusset plates 42 and 43 reinforce the joints between the horizontal bars 16 and 17 and the corner post 10. In like manner the joints between the horizontal bars 26 and 27 and the upright post 24 are reinforced by brackets or gusset plates 44 and 45 and between the other upright post 25 and bars 26 and 27 by gusset plates or brackets 46 and 47. To reinforce the connection between the horizontal bar 28 and the post 24 is a bracket or gusset plate 48 and to reinforce the connection between the horizontal bar 30 and the post 25 at the opposite side of the machine is a reinforcing bracket or gusset plate 49.

Struts 50 and 51 respectively reinforce and connect the upper horizontal bar 29 with the front post 11 and the rear post 24 on one side of the frame, and on the opposite side of the frame similar struts 52 and 53 respectively reinforce and connect the horizontal bar 31 with the front post 10 and the rear post 25. Also at each side of the machine, the top or horizontal bar 29 is connected by a diagonal brace 54 with the lower end of the front post 11 and by a diagonal brace 55 with the upper end of the rear post 13. These diagonal braces may be connected to other braces and posts which lie in their paths for obtaining greater rigidity. On the opposite side of the machine a diagonal brace 56 connects the intermediate portion of the top horizontal bar 31 with the lower portion of the front post 10 and a similar brace 57 connects the intermediate portion of the top bar 31 with the upper portion of the rear post 12. Thus a strong rigid frame structure is provided which will withstand the shock, stress and strains to which it is subjected and without the vibration causing it to move from its location.

On the inner side of horizontal bars 28 and 29 at one side of the machine is located a plate 58 and a similar plate 59 is located at the opposite side of the machine in contact with the bars 30 and 31. Opposed bearings 60 located outwardly of said plates at each side of the machine are suspended from and fixed to horizontal top bars 29 and 31, such opposed bearings 60 serving to support an outwardly projecting pivot pin 61 carried in bosses of opposed end plates 62 which are reinforced by ribs 63 radiating outwardly from bosses 64. Each end plate 62 is provided with a pair of crank pin bosses so that identical plates may be used, one at each end of the screening cage but with only the bosses adjacent the front of the machine drilled in proper alignment to receive crank pins 65 spaced radially from pivot pin 61, which crank pins are encircled by bearings 66 attached to adjustable length connecting rods 67, one at each side of the machine. Each connecting rod 67 is connected at its lower end by an additional bearing 68 with a crank pin 69 on disk wheel 70 at each side of the machine, such disk wheels being fixedly mounted in registering positions on a shaft 71 in pillow block bearings 72. At each side of the machine adjacent the disk wheels and on the shaft 71 is fixed a relatively large pulley 73 which is driven by a belt 74 from a motor or other source of power 75.

The motor has a supporting base, the ends 76 of which slide along the box-shaped beam members by bolts or other fasteners 78. An adjusting screw 79 in the front of the cabinet of the machine serves to vary the tension on the belt 74. This adjusting screw engages the plate or a projection on the frame and when rotated causes the motor to move forwardly or rearwardly to vary the tension on the drive belt 74.

Operation of the belt 74 by the motor 75 produces rotation of the pulley 73 and the disk wheels 70 rotating the crank pins 69 which reciprocate the connecting rods 67 to impart oscillatory movement to the ends 62 of the container, the crank pins 65 moving in curved slots 80 of the plates 58, 59 of the machine. The end plates 62 have straight bottom edges 81 and sloping front and rear straight edges 82 and 83 and such end plates have their spaced bottom, front, and rear edges connected by spaced parallel bars or rods 84, the ends of which preferably are welded within openings in the end plates. Also the parallel bars along the bottom, front, and rear sides are provided with transverse reinforcing strips 85 of which there are preferably five in number, each provided with openings in which the bars or rods 84 are received and welded. Front and back top reinforcing strips extend between the end plates and are welded at their ends to such plates and to the intermediate reinforcing strips 85 of which also there are preferably five in number.

The screening cage is provided with a top cover or lid having a frame 87 which may be hinged at its rear upper edge and comprises parallel rods or bars 88 with a series of reinforcing strips 89, rods or bars 88 having their ends welded within receiving openings in the frame 87 and also being received within openings in and welded to the reinforcing bars 89 which in turn are welded to the frame. A hook 90 is mounted on each end plate 62 of the screening cage and is engaged by a lug 91 having a threaded body 92 in which the screw 93 is disposed, said screw being mounted by a swivel joint such as a ball and socket joint 94 on the cover.

Beneath the container or screening cage in which the material is treated is mounted a pan 95 having a handle 96 by which it may be removed, such pan being slidably supported on a channel shaped panel 97 extending across the frame and having upstanding flanges 97' at each side outwardly of the plates 58 and 59. A housing for the container is provided by a front plate 98 and a rear plate 99 suspended from the front bar 17 and the rear bar 27 respectively and connected to plates 58 and 59.

A housing for the mechanism is provided by means of a plate 100 extending across the entire front of the machine and provided with an opening 101 through which the tray or pan 95 may be inserted and removed. Plates 102 are attached to the frame at each side of the machine, each side plate being provided with a removable section 103, to afford access to the bearings 60 and 66 in the upper portion of the machine, and another removable section 104 to afford access to the bearings 68 in the lower portion of the machine. A top member 105 is employed which may be integral with side plates 58 and 59 and front and back plates 98 and 99. Said top member overlies the top frame members 17, 27, 29 and 31 and has a downwardly extending flange 105' disposed outwardly of the side walls and front and rear walls. The machine is provided with a cover 106 having a horizontal flange 106' overlying the top member 105. The cover also has a downwardly extending rib 106" which extends into the opening in the top member 105 to prevent meat from collecting on the latter. The cover is mounted by hinges having arms 107 attached to the cover and cam portions 108 connected by pivots 109 with supporting lugs 110 pivotally mounted on the top member 105. The cam portions 108 are provided with notches 111 which are adapted to be engaged by pins 112 projected by springs 113 so that when the cover is raised it will be held in open position until it is pulled down into closed position, the spring pressed pin also reacts with cam portion 108 to resiliently hold the cover in closed position.

If desired, leveling feet may be provided including socket members 114 adapted to be secured to the floor by means or screws 115, said socket members each being adapted to receive a pair of cushioning pads 116 which support disk feet 117 to which are attached threaded studs 118 which screw into each of the corner posts of the machine. The disks 117 may be rotated for leveling the machine. Although the leveling feet beneath the corner posts have been disclosed with the reinforced frame structure, the use of these feet is not imperative as the machine will not move about the floor, but will remain stationary, and on account of its rugged construction the machine will last indefinitely notwithstanding the shock caused by the change in direction of movement of the screening cage for the material treated.

A guard 119 is attached by fasteners 120 to each end plate 62 of the screening cage along the forward, bottom and lower rear edges of the end plates to prevent the material discharged from the container through the spaces between the bars or rods 84 from passing through the arcuate slots 80.

The screening cage which has been described as having a relatively narrow flat bottom with sides extending at obtuse angles therefrom and with a substantially larger removable top has been found most satisactory. However, it is contemplated that screening cages of other shapes, as for example, that of semi-cylindrical shape, as shown in Fig. 3, or of rectangular shape as illustrated in Fig. 4 may be employed. In Fig. 4 the screening cage comprises end member 121 provided with pivot studs 122 and such ends are connected by means of parallel rods or bars 123 reinforced by strips 124 corresponding to the rods or bars 84 and the strips 85 of the screening cage of Fig. 1. In Fig. 3 end members 125 are provided with bearing studs 126 and similar rods 127 and are reinforced by strips 128, the rods being welded to the ends and to the reinforcing strips in the structures of both Figs. 3 and 4.

It has been found that a screening cage or container of a width between side plates 62 of approximately 17¾ inches, with the dimension from front to rear at the top of approximately 14 inches, a bottom dimension from front to rear of approximately 4 inches, and a height of approximately 10¾ inches, has been highly satisfactory. The height or width of top plates 86 is approximately 3¼ inches. The rods or bars 84 are preferably of stainless steel approximately ⅛ inch to 3/32 of an inch in diameter and spaced apart approximately 5/32 of an inch. The cross sectional shape of the screening cage has been found to be particularly effective with the slanted sides preventing the meat from being forced into the corners of the same.

A crankshaft speed of 243 revolutions per minute producing 486 oscillations of the screening cage per minute and with an amplitude of oscillation of the basket of approximately 85° of arc has been found particularly effective. The reinforced construction of the frame including the diagonal bracing results in a rigid rugged construction for withstanding the necessary stresses. Although the precise dimensions and speed and amplitude of operation have been particularly effective, the examples are given by way of illustration rather than limitation, except as required by the prior art.

The separation above described may be aided by the use of fluid under pressure applied to the material treated. The pivot pins 61 supporting the screening cage may be provided with a longitudinal bore therethrough in which a tube 129 is supported. The tube 129 is provided with nozzles 130 or other jet forming means for directing fluid under pressure against the material in the screening cage. The tube 129 extends outwardly of the entire casing through a slot 131 in the access plate 103. A valve 132 is arranged in the fluid supply pipe 133 for controlling the flow of air, water or the like fluid from any suitable source to the tube 129.

The fluid supplied may be drying air under pressure sufficient to agitate the material and dry the same to an appreciable extent and such drying action causes the particles of bones to become whiter whereby any particles of bones passing through the grating may be readily observed and removed either by manual methods or by mechanical means which may include photoelectric cells or the like. Also the dry bone particles may be readily separated from the meat particles by flotation in a brine solution whereby the dry cellular bones will float and can be removed by skimming the solution containing the submerged meat particles.

The fluid for treating the material in the screening cage may be a liquid which produces additional agitation and scouring of the material within the basket. When liquid is used, a suitable trough arrangement is provided for carrying away the liquid and such trough may be formed by the panel 97 and the upstanding webs 97'. The liquid may then be drained from the meat and the meat is ready for further processing or canning. Agitation may be accomplished entirely by the fluid in some instances and the tube 129 may be oscillated about its axis by suitable means such as cranks, cams, or the like.

It will be obvious to those skilled in the art that various changes may be made in this device without departing from the spirit of the invention and therefore the invention is not limited by that which is shown in the drawing and described in the specification but only as indicated in the appended claims.

What is claimed is:

1. A machine for separating portions of material of different degrees of hardness comprising a supporting frame, bracing means for said frame, spaced axially aligned bearings mounted in said frame, a relatively rigid screening cage having an impact portion, and spaced end plates disposed between said bearings, pivots on said end plates supported in said bearings, said screening cage having walls with spaced bars providing discharge openings between the same, a driving connection at each end of and connected to said screening cage for oscillating the latter, means for supplying driving force to said connections sufficient to oscillate said screening cage and sudden reversal of direction thereof in a manner to cause violent impact of material within said cage against the walls of the same to produce separating action on material within said cage and to discharge a portion of said material from said screening cage through said discharge openings, and a tube disposed lengthwise within said screening cage for directing fluid onto material for facilitating the separating action.

2. A machine for separating portions of material of different degrees of hardness comprising a supporting frame, bracing means for said frame, spaced axially aligned bearings mounted in said frame, a relatively rigid screening cage having an impact portion, and spaced end plates disposed between said bearings, pivots on said end plates supported in said bearings, said screening cage having walls with spaced bars providing discharge openings between the same, a driving connection at each end of and connected to said screening cage for oscillating the latter, means for supplying driving force to said connections sufficient to oscillate said screening cage and sudden reversal of movement thereof in a manner to cause violent impact of the material within said cage against the walls of the same to produce separating action on material within said cage and to discharge a portion of said material from said screening cage through said discharge openings.

3. A machine for separating relatively soft from relatively hard portions of material comprising a screening cage for the material to be separated, said cage having an impact portion, and said cage also having connected thereto means for producing partial rotation of said screening cage and sudden reversal of movement at sufficient speed to cause violent impact of the material within the screening cage against the wall of the latter so that the slamming action produces separation of the softer from the harder portions of the material treated, said screening cage comprising spaced end members and substantially parallel bars connecting the same, a series of strips reinforcing said bars, said strips having spaced holes in which said bars are received, said bars being approximately ⅛ to 3/32 of an inch in diameter and spaced approximately 5/32 of an inch, said screening cage having parallel top and bottom walls and slanting sides designed to prevent meat from being forced into the corners.

4. A machine for separating relatively soft from relatively hard portions of material comprising a screening cage for the material to be separated, said cage having an impact portion, and said cage also having connected thereto means for producing partial rotation of said screening cage and sudden reversal of movement at sufficient speed to cause violent impact of the material within the screening cage against the wall of the latter so that the slamming action produces separation of the softer from the harder portions of the material treated, said screening cage comprising spaced end members and substantially parallel bars connecting the same, a series of strips reinforcing said bars, said strips having spaced holes in which said bars are received, said bars being approximately ⅛ to 3/32 of an inch in diameter and spaced approximately 5/32 of an inch.

5. A machine for separating softer from harder portions of material comprising a frame, a screening cage pivotally mounted for limited oscillation on said frame, said cage having an impact portion a crankshaft mounted on said frame in substantially parallel relation to said screening cage, means for oscillating said screening cage from said crankshaft in a manner to produce sudden change of direction and violent impact of the contents with the cage including a crankpin on each end of said cage, a connecting rod driving said crankpin from said crankshaft, a housing for said cage having arcuate slots in which said crankpins oscillate, a guard mounted on each end of said cage for preventing material discharged from the cage from being projected through said slots, and a tube extending into said screening cage for directing fluid onto material for facilitating separation of said material.

6. A machine for separating softer from harder portions of material comprising a frame, a screening cage pivotally mounted for limited oscillation on said frame, said cage having an impact portion a crankshaft mounted on said frame in substantially parallel relation to said screening cage, means for oscillating said screening cage from said crankshaft in a manner to produce sudden change of direction and violent impact of the contents with the cage including a crankpin on each end of said cage, a connecting rod for driving said crankpin from said crankshaft, a housing for said cage having arcuate slots in which said crankpins oscillate, and a guard mounted on each end of said cage for preventing material discharged from the cage from being projected through said slots.

7. A machine for separating material comprising a frame having uprights, longitudinal and transverse members, diagonal bracing, bearings supported on said frame, a screening cage having an impact portion, and said cage also having rigid end plates, means to pivotally mount the end plates of said screening cage on said frame for oscillatory movement, a crankshaft rotatably mounted on said frame and having a crank adjacent each end of the screening cage, adjustable connecting rods extending from said cranks to said end plates and pivotally secured to said cranks and end plates, said cranks being of the same length disposed in the same angular position whereby rapid rotation of said crankshaft will cause oscillation and sudden reversal of the direction of such movement of said screening cage providing equal force on each end thereof, said screening cage being effective to produce violent impact on material placed therein.

8. Apparatus for separating small particles of meat from relatively small bones comprising a screening cage for meat and bones, said cage having an impact portion means to pivotally mount said screening cage for oscillating motion about an axis passing through the ends of said screening cage, said screening cage having side walls a pair of which are parallel and others being inclined to the first whereby a slamming action is produced as said screening cage oscillates, and means to oscillate and produce sudden reversal of direction of movement of said screening cage about its axis to produce separation of the meat from the bones, and for discharging the same from said screening cage and retaining the bones therein.

9. A machine for separating softer from harder portions of material comprising a screening cage in which the material to be treated is adapted to be placed, said cage having an impact portion, and end walls and side walls with spaced bars providing discharge openings therebetween, means supporting said cage in a manner to allow it to be moved to project contained material against said bars, means for moving said cage and changing the direction of movement with sufficient speed to cause violent impact of material within said cage against the walls of the same to thereby detach the softer from the harder portions of the material and to discharge the softer portions from the cage between said bars while retaining the harder portions within said cage.

10. Apparatus for separating meat from objects such as whole cooked chicken necks comprising a frame, bearings mounted on said frame, arbors journalled in said bearings and having a common axis, a screening cage having an impact portion, and said cage also being disposed between and mounted on said arbors and having in its lower portion a wall including a screen arranged to permit the passage of meat while precluding the passage of bones and cartilage therethrough, a receptacle removably supported in said frame below said screening cage, and power means mounted on said frame and drivingly connected to said screening cage for imparting rapid motion and change of direction thereto and of sufficient velocity to cause violent impact between said cage and the material contained in order to loosen and produce separation of one part of the material from another, and agitating means for producing agitation within said screening cage.

11. Apparatus for separating softer material from harder material comprising a container for the material to be separated having an impact portion, and said container having discharge areas through which the softer material may pass but precluding the passage of the harder material, supporting bearings operatively associated with the container for mounting said container to permit movement and frequent sharp changes in the direction of such movement, and means for producing rapid movement and changes in direction of movement of said container sufficiently to project the contents of the container with sufficient velocity to produce violent impact of the material within the container against the wall of the latter.

12. Apparatus for treating material to separate portions having different degrees of hardness comprising supporting structure, a container for material to be treated, said container having an impact portion, and discharge areas through which the softer material may pass but precluding the passage of harder material, means whereby access may be had to the interior of said container, supporting bearings operatively associated with the container for mounting said container on said supporting structure in a manner to permit the container to be rapidly moved in a path which includes changes in direction of the movement, and means for producing such movement with sufficient velocity to project the contents against the container to produce violent impact.

13. Apparatus for treating material having portions of different degrees of hardness for removing part of the material from other of the material of greater hardness comprising a containing for the material to be separated having an impact portion, and supporting bearings for mounting said container so that it may have limited movement, and actuating means operatively connected to said container for producing rapid movement and change of direction of said container and of sufficient velocity to produce violent impact between the container and the material contained in order to loosen and produce separation of one part of the material from another.

14. Apparatus for treating material having relatively soft portions and harder portions comprising a screening container for material to be treated having an impact portion, and discharge areas through which relatively soft material may pass but precluding the passage of harder material, means whereby access may be had to the interior of said screening container, a supporting structure including bearings for said screening container, means for mounting said screening container on said supporting structure in a manner to permit the screening container to be rapidly moved and its path of movement sharply changed, actuating means operatively connected to the container for producing rapid movement including sudden change of direction of said screening container and with sufficient velocity so that the material will be violently projected against the container to produce separation of the soft from the harder of the mass, and power means for producing movement of the container to produce slamming of the material and consequent separating action.

15. Apparatus for separating matter having a relatively soft flexible portion and a harder portion one from the other comprising a container for the material to be separated, having an impact portion, and said container also having discharge areas through which the softer material may pass but which prevents the passage of the harder material, supporting bearings operatively associated with the container for mounting said container to permit movement and frequent sharp changes in the direction of such movement, and actuating means operatively connected to said container for producing rapid movement and changes in direction of movement of said container to project the contents of the container with velocity sufficient to produce violent impact of material within the container against the wall of the latter to produce separation of the softer material from the harder material.

References Cited in the file of this patent

UNITED STATES PATENTS

| | | |
|---|---|---|
| 1,565,342 | Umrath | Dec. 15, 1925 |
| 2,299,946 | Alkire | Oct. 27, 1942 |
| 2,516,963 | Derbenwick et al. | Aug. 1, 1950 |
| 2,553,113 | Ruggiero | May 15, 1951 |
| 2,652,588 | Harris | Sept. 22, 1953 |
| 2,690,197 | King | Sept. 28, 1954 |

FOREIGN PATENTS

| | | |
|---|---|---|
| 303,155 | Great Britain | Mar. 21, 1929 |